UNITED STATES PATENT OFFICE.

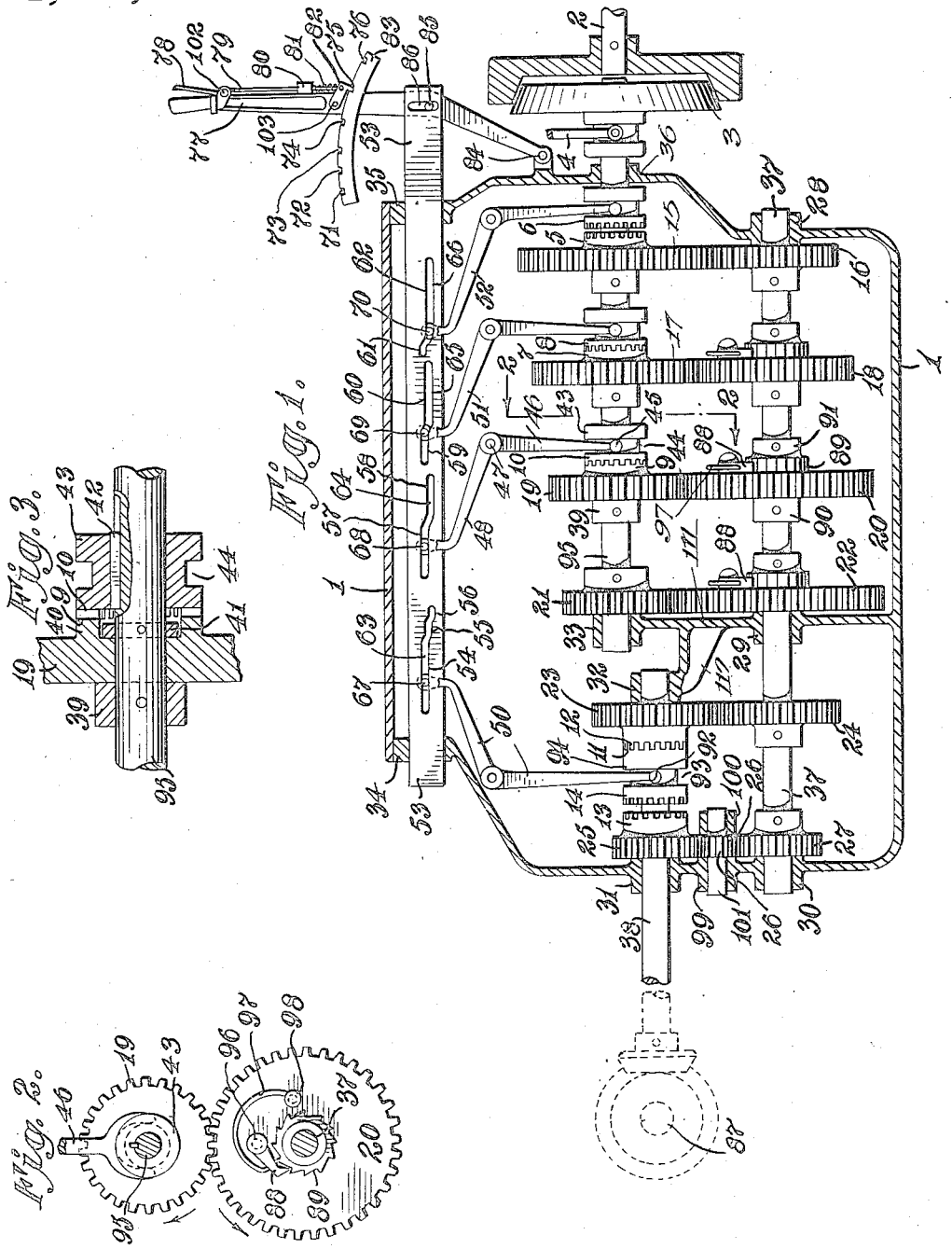

LUTHER RINGER, OF BUFFALO, NEW YORK, ASSIGNOR TO THE SIMMEN AUTOMATIC RAILWAY SIGNAL COMPANY, OF BUFFALO, NEW YORK, A CORPORATION OF ARIZONA.

POWER-TRANSMITTING MECHANISM.

1,232,608.  Specification of Letters Patent.  Patented July 10, 1917.

Application filed August 6, 1915. Serial No. 44,059.

*To all whom it may concern:*

Be it known that I, LUTHER RINGER, a citizen of the United States, residing at Buffalo, in the county of Erie and State of New York, have invented certain new and useful Improvements in Power-Transmitting Mechanism, of which the following is a specification.

This invention relates to a mechanism for power transmission by means of which a shaft is rotated at a speed varying with respect to the speed of a driving shaft. Its novelty consists in the construction and adaptation of the parts.

In the drawings, there is illustrated a preferred form of mechanism embodying the invention, and for the sake of clearness, it is shown applied to a motor driven vehicle, the positions of the parts shown in the principal figures being those assumed when the vehicle is proceeding forward at the second intermediate speed. I do not limit myself to the application of my invention to motor driven vehicles. It may be used in any relation where it is desirable to transmit power from a shaft driven at constant speed to a second shaft at varying speeds. In the mechanism illustrated, I have shown a device capable of four forward and one backward speed, but the number of speeds may be varied to suit the exigencies of use without departing from the essential principles of the invention.

In the drawings, Figure 1 is a central section through and a side elevation of the gear case and adjacent parts; Fig. 2 is a vertical section on the plane of the line 2—2 in Fig. 1, showing the means of coupling the gears to the driven shaft; and Fig. 3 is an enlarged sectional view of one of the driving gears and its coöperating clutch.

In the drawings, 1 indicates a gear case provided with a partition 111, having a bracket 112, and in its side walls and in the partition and bracket there are formed bearings, namely 36 and 33 in which a driving shaft 95 is adapted to revolve; 28, 29 and 30 in which a driven shaft 37 is adapted to revolve; 99 and 100 in which an idler shaft 101 is adapted to revolve, and 31 and 32 in which a transmission shaft is adapted to revolve. The gear case is also provided with slideways 34 and 35 in which a control bar 51 is adapted to be reciprocated.

A motor shaft indicated at 2 terminates in a clutch member adapted to be engaged by a coöperating clutch member 3 on the shaft 95, and which latter member is operated in the usual manner by a lever 4 (only the lower part of which is shown).

The shaft 95 carries a series of driving gears 15, 17, 19 and 21, which are adapted to mesh with a series of driven gears 16, 18, 20 and 22 carried by the shaft 37.

The gear 19 is mounted rotatably upon the shaft 95 but is prevented from sliding thereon by means of collars 39 and 41 rigidly secured to the shaft, the collar 41 being located inside of an annular flange 40 projecting from the face of the gear (see Fig. 3), and which flange has on its outer end a series of teeth 9 adapted to mesh with a similar series of teeth 10 carried on the end of a collar 43 which is slidably mounted upon the shaft 95 but is prevented from rotating thereon by a key or feather 42. In the collar 43 is a groove 44 adapted to be engaged by two rollers 45 carried by the forked arm 46 of a bell crank lever 48 pivoted at 47 to a fixed part of the casing, the other arm of the lever being also forked to straddle the control bar 53 and carrying a roller 68 adapted to engage a slot 64 in such bar. The teeth 9 and 10 and sliding collar 43 form a coupling between the gear wheel and the shaft, operated by the bell crank lever when moved through the reciprocation of the control bar.

The gear 20 is rotatably mounted on the shaft 37 but prevented from sliding thereon by collars 90 and 91 rigidly secured to the shaft. At one side, the collar 91 is provided with means for coupling the gear to the shaft in the form of a ratchet disk 89, which is adjacent to the side of the gear and is adapted to be engaged by a pawl 88 mounted on the gear by a pivot 96 and pressed into engagement with the ratchet by a spring 97. The gears 15 and 17 have coupling members like the gear 19 and the gears 18 and 22 have coupling members like the gear 20. In the case of the gear 22, one of the bearings 29 takes the place of the collar 90. The gear 16 is rigidly secured to the shaft 37 and the gear 21 to the shaft 95.

On an extension of the shaft 37 are rigidly secured gears 24 and 27. The gear 24 is adapted to mesh with the gear 23 rotatably mounted on the shaft 38 and prevented from lateral movement by an annular flange provided with an inside collar similar to the collar 41. This flange is provided with a series of teeth 12 adapted to mesh with a similar series of teeth 11 on a collar 94 mounted to slide on the shaft 38 and caused to turn therewith by a key (not shown). This collar is provided with a groove 93 adapted to be engaged by rollers 92 of a bell crank lever 50 similar to the lever 48, and it is also provided with a series of teeth 14 adapted to mesh with a similar series of teeth 13 on a flange projecting from a gear wheel 25 secured on the shaft 38. The gear 27 is adapted to mesh with an idler gear 26 rigidly attached to a shaft 101, and this idler gear in turn meshes with the gear 25. The transmission shaft 38 is extended to the driving axle of the vehicle indicated at 87. Bell cranks 51 and 52 similar to the bell crank 48 are provided with rollers at each end like that crank.

The control bar 53 is provided with a series of slots 63, 64, 65 and 66 in which operate the rollers 67, 68, 69 and 70, carried by the levers 50, 48, 51 and 52 respectively. The lever 50 together with its coöperating parts controls the sliding sleeve forming one member of each of the clutches 11—12 and 13—14, which in turn causes the shaft 38 to be driven from the gear 23 or 25. The lever 48 controls the clutch 9—10 of the gear 19. The lever 51 controls the clutch 7—8 of the gear 17; and the lever 52 controls the clutch 5—6 of the gear 15. The slot 63 is composed of three parts 54, 55 and 56, the slot 64 of two parts 57 and 58, the slot 65 of two parts 59 and 60, and the slot 66 of two parts 61 and 62. The different parts of these several slots have different lengths and levels, but it will be noticed that the left ends of all the slots are on the same level and that the right ends of all the slots are on the same level.

The reciprocation of the control bar 53 is accomplished by means of an operating lever 77 pivotally mounted at 84 to a lug projecting from the gear case. Rigidly secured to this lever is a pin 85 adapted to move in a vertical slot 86 in the control bar. The lever 77 is provided with a catch 82 pivotally mounted at 103 and controlled by a handle 78 pivoted at 102 on the lever and connected with the catch by a rod 79 supported in a bearing 80 and around which rod is coiled a spring 81 to maintain the catch in engagement with six notches 71, 72, 73, 74, 75 and 76 in the top edge of a sector 83 arranged adjacent to the lever.

It will be noted that the driving gears 15, 17, 19 and 21 progressively decrease in size from right to left, and that the coöperating driven gears meshing therewith progressively decrease in size from left to right. The ratio of the gears 19 and 20 is greater than the ratio of the gears 21 and 22 and less than that of the gears 17 and 18 and 15 and 16. It will be readily understood by anyone skilled in the art that the shaft 37 will be driven from the shaft 95 at a speed determined by the ratio of that pair of gears of the highest ratio whose clutch is in mesh. For instance, if the clutch 5—6 is out of mesh and the clutches 7—8 and 9—10 are in mesh, the speed of the shaft 37 will be determined by the ratio of the gears 17 and 18. In such case, the gear 15 would be revolving independently of the shaft 95 being driven by the gear 16; and the gear 20 would be revolving at a slower rate than the shaft 37, the difference in their speeds being accounted for by the sliding of the coupling pawl upon its ratchet. In the same way the gear 22 would be revolving more slowly than the shaft 37 but still slower than the gear 20.

When the operating lever 77 is brought to such a position that the catch 82 is in the notch 71, the roller 67 of the bell crank 50 will be in the part 56 of the slot 63, and the clutch 13—14 will be in mesh and the clutch 11—12 out of mesh. The roller 68 of the bell crank 48 will be in the part 58 of the slot 64 and the clutch 9—10 will be out of mesh. The roller 69 of the bell crank 51 will be in the part 60 of the slot 65 and the clutch 7—8 will be out of mesh, and the roller 70 of the bell crank 52 will be in the part 62 of the slot 66 and the clutch 5—6 will be out of mesh. The shaft 37 will therefore be driven from the shaft 95 according to the ratios of the gears 21 and 22 which is low speed. The shaft 38 will be driven from the shaft 37 through the gears 27, 26 and 25 and the rotation of the shaft will therefore be backward.

When the catch 82 is in the notch 72 the roller 67 will be in the part 55 of the slot 63 and the clutches 13—14 and 11—12 will be out of mesh, the roller 68 will be in the part 58 of the slot 64 and the clutch 9—10 will be out of mesh, the roller 69 will be in the part 60 of the slot 65 and the clutch 7—8 will be out of mesh, and the roller 70 will be in the part 62 of the slot 66 and the clutch 5—6 will be out of mesh. Therefore the shaft 37 will be driven by the shaft 95 in accordance with the ratios of the gears 21 and 22, but the shaft 38 will not be driven due to the fact that the gears 23 and 25 are both rotating independently of that shaft and no power will be delivered to the wheels of the mechanism.

When the catch 82 is in the notch 73 the roller 67 will be in the part 54 of the slot 63 and the clutch 11—12 will be in mesh, the roller 68 will be in the part 58 of the slot 64, and the clutch 9—10 will be out of mesh, the roller 69 will be in the part 60 of the slot 65 and the clutch 7—8 will be out of mesh, and the roller 70 will be in the part 62 of the slot 66 and the clutch 5—6 will be out of mesh. The shaft 37 will therefore be driven from the shaft 95 according to the ratios of the gears 21 and 22, the shaft 38 being driven through the gears 24 and 23 at low forward speed.

When the catch 82 is in the notch 75, roller 67 will be in the part 54 of the slot 63, and the clutch 11—12 will be in mesh, the roller 68 will be in the part 57 of the slot 64 and the clutch 9—10 will be in mesh, the roller 69 will be in the part 60 of the slot 65 and the clutch 7—8 will be out of mesh, and the roller 70 will be in the part 62 of the slot 66 and the clutch 5—6 will be out of mesh. Therefore the shaft 37 will be driven at a speed determined by the ratios of the gears 19 and 20, and as the shaft 38 is driven by means of the gears 24 and 23 it will move forward at the first intermediate speed.

When the catch 82 is in the notch 74, the the roller 67 will be in the part 54 of the slot 63, and the clutch 11—12 will be in mesh, the roller 68 will be in the part 57 of the slot 64 and the clutch 9—10 will be in mesh, the roller 69 will be in the part 59 of the slot 65 and the clutch 7—8 will be in mesh, and the roller 70 will be in the part 62 of the slot 66 and the clutch 5—6 will be out of mesh. Therefore the shaft 37 will be driven at a rate of speed determined by the ratios of the gears 17 and 18 and as the shaft 38 is driven by the gears 24 and 23 it will move forward at the second intermediate speed.

When the catch 82 is in the notch 76, the roller 67 will be in the part 54 of the slot 63, and the clutch 11—12 will be in mesh, the roller 68 will be in the part 57 of the slot 64 and the clutch 9—10 will be in mesh, the roller 69 will be in the part 59 of the slot 65 and the clutch 7—8 will be in mesh, and the roller 70 will be in the part 61 of the slot 66 and the clutch 5—6 will be in mesh. The shaft 37 will therefore be driven at a speed determined by the ratio of the gears 15 and 16 and the shaft 38 through the gears 24 and 23 will be moved forward at high speed.

The described mechanism has many advantages. The operating lever is moved progressively in a vertical plane, which is the simplest form of lever to operate and understand. There is but one lever to control all variations in speed and there is therefore no danger of a mistake between forward and backward speed. There is no danger of stripping gears when changing speed because the driving and driven gears are always in mesh. The gears can be shifted easily without throwing out the engine clutch and spiral or irregular gear teeth can be used to eliminate noise. The device is simple and compact, has few parts which may be readily made from standard material and which are economical to make and replace.

I claim:—

1. A power transmitting mechanism, comprising a driving shaft a gear fixed to the shaft, a series of gears loosely mounted thereon and progressively differing in diameter from the gear fixed thereon, a driven shaft, a gear fixed to the driven shaft, a series of gears loosely mounted on the driven shaft and progressively differing in diameter from the gear secured to said driven shaft, the two series of gears being in constant mesh for respectively turning the driven shaft in one direction, means for coupling automatically to the driven shaft that one of its gears which is driven fastest from the driving gears, and means for coupling the driving gears to the shaft.

2. In a device of the character described, a driving shaft, a series of gears mounted thereon and progressively varying in size, a driven shaft, a series of gears mounted thereon and progressively varying in size in inverse proportion to the driving gears, means for intermittently coupling any of the gears on the driving shaft to the shaft except the smallest one of the series which is permanently secured on such shaft, and means for coupling the gears on the driven shaft to such shaft except the smallest one of such series which is permanently secured thereon, and means whereby the coupling of any of the driven gears and the shaft is adapted to slip when the shaft is rotated faster than such gear.

3. A power transmitting mechanism, comprising a driving shaft and a driven shaft, a gear fixed to each shaft, a gear loosely mounted on the other shaft and meshing with the gear fixed to the opposite shaft, means for clutching and unclutching one of the loose gears and its shaft, means for permitting the rotation of the other loose gear on its shaft in one direction and preventing the relative rotation in the opposite direction, other sets of coacting gears loosely mounted on both shafts, means for clutching and unclutching certain of the gears of said sets and the shaft on which they are mounted, and means permitting the rotation of the other gears of said sets on their shaft in one direction while preventing their rotation with respect to the shaft in the opposite direction.

4. In an apparatus of the kind described, a driving shaft, a series of gears loosely mounted thereon and progressively decreasing in size to a gear rigidly mounted thereon, a driven shaft, a series of gears loosely mounted thereon and progressively increasing in size from a gear rigidly mounted thereon, the two series of gears being permanently in mesh, means for temporarily coupling to the driven shaft that one of its gears which is driven fastest by the driving gears and manually operated means for coupling any of the driving gears to their common shaft except the smallest gear.

5. A power transmitting mechanism comprising a driving shaft, a gear fixed to the shaft, a series of gears loosely mounted thereon and progressively differing in diameter from the gear fixed thereon, a driven shaft, a gear fixed thereto, a series of gears loosely mounted thereon and progressively differing in diameter from the gear secured thereon, the two series of gears being in constant mesh for respectively turning the driven shaft in one direction, means for coupling automatically to the driven shaft that one of its gears which is driven fastest from the driving gears, and manually operated means for coupling the driving gears to the shaft, the latter means including an operating lever, a control bar moved thereby to predetermined positions, a series of clutch levers moved in accordance with the movement of the control bar, and clutches moved by such levers to couple the loosely mounted gears to the driving shaft.

6. In a device of the character set forth, a driving shaft and a driven shaft, sets of permanently intermeshed gears of different ratios for connecting the shafts, one of the gears of each set with the exception of one being loosely mounted on one of the shafts, the excepted gear being fixed to the said shaft, means for preventing relative movement between the loose gears and the shaft in one direction and permitting said relative movement in an opposite direction, one of the gears of each set being also loosely mounted on the other shaft, and means for clutching the last mentioned gears to said other shaft.

7. In a device of the character described, a control bar provided with a series of slots of different lengths and levels, one end of all the slots being on the same level and the opposite end of all the slots being on a different level, a series of clutch levers coöperating with the control bar, each lever having a member adapted to engage one of the slots and an opposite member adapted to engage a clutch, the bar thus slotted being adapted to control forward speeds of the power transmitting mechanism in which it is placed.

8. In a device of the character described, comprising a driving shaft and gears mounted thereon, clutches adapted to couple the same to the shaft, a driven shaft and gears mounted thereon and in constant mesh with the driving gears, a control bar provided with a series of slots and a series of clutch levers coöperating therewith, each lever having a pin or roller adapted to engage one of the slots, all of the slots being of different lengths and each composed of two levels, the lower levels of all the slots being coincident, the bar thus slotted being adapted to control forward speeds of the mechanism, in combination with another slot, roller and clutch lever, and which slot has three levels, the lower one of which is coincident with the lower level of the other slots and which slot in said bar is adapted to control a backward speed of the mechanism.

9. In a device of the kind described, a driving shaft and gears mounted thereon and progressively decreasing in size, a driven shaft and gears mounted thereon and progressively increasing in size, the series of gears being in permanent mesh, means for coupling temporarily to the driven shaft that one of its gears which is driven fastest, and manually operated means for coupling any of the driving gears to its shaft, in combination with a transmission shaft, two gears loosely mounted thereon, means for driving either gear from the driven shaft, and a clutch between the two gears whereby the gears may be coupled to the shaft to rotate it in either direction.

10. In an apparatus of the kind described, a driving shaft and gears mounted thereon, a driven shaft and gears mounted thereon, in mesh with the first series of gears, a transmission shaft, two gears loosely mounted thereon, and means for driving either from the driven shaft, a clutch between the two gears whereby either may be coupled to the transmission shaft and a common means for coupling to the driving shaft and transmission shaft any of the series of gears to secure in the apparatus a backward and several forward speeds for the transmission shaft.

11. In a device of the character set forth, a driving shaft and a driven shaft, sets of permanently intermeshed gears of different ratios for connecting the shafts, one of the gears of each set with the exception of one being loosely mounted on one of the shafts, the excepted gear being fixed to said shaft, means for preventing relative movement between the loose gears and the shaft in one direction and permitting such relative movement in an opposite direction, one of the gears of each shaft with the exception of one being loosely mounted on the other shaft, said excepted gear being fixed to said latter shaft, and means for clutching the last mentioned loose gears to said other shaft.

In testimony whereof I affix my signature in presence of two witnesses.

LUTHER RINGER.

Witnesses:
P. J. SIMMEN,
C. E. CHATFIELD.